United States Patent
Hammer et al.

(10) Patent No.: US 6,585,289 B1
(45) Date of Patent: Jul. 1, 2003

(54) BELT SYSTEM WITH INFLATABLE SECTION WITHIN AN OUTER BELT SECTION AND METHOD OF RESTRAINT

(75) Inventors: David R. Hammer, Glendale, AZ (US); Robert V. McClenathan, Scottsdale, AZ (US); A. Gary Smith, Glendale, AZ (US)

(73) Assignee: Universal Propulsion Company, Inc., Phoenix, AZ (US)

( * ) Notice: Subject to any disclaimer, the term of this patent is extended or adjusted under 35 U.S.C. 154(b) by 0 days.

(21) Appl. No.: 09/703,552

(22) Filed: Nov. 1, 2000

Related U.S. Application Data

(63) Continuation of application No. 09/099,858, filed on Jun. 18, 1998, now abandoned.

(51) Int. Cl.[7] .............................................. B60R 21/18
(52) U.S. Cl. ................... 280/733; 297/216.13; 297/483
(58) Field of Search ........................ 280/733; 297/216.1, 297/216.13, 483; B60R 21/18

(56) References Cited

U.S. PATENT DOCUMENTS

| | | | | |
|---|---|---|---|---|
| 3,841,654 A | * | 10/1974 | Lewis | ........................ 280/733 |
| 3,869,145 A | * | 3/1975 | Takada | ........................ 280/733 |
| 4,348,037 A | * | 9/1982 | Law et al. | ................... 280/733 |
| 5,303,953 A | * | 4/1994 | Kamiyama et al. | ......... 280/733 |
| 5,465,999 A | * | 11/1995 | Tanaka et al. | .............. 280/733 |
| 5,474,326 A | * | 12/1995 | Cho | ............................ 280/733 |
| 5,839,753 A | * | 11/1998 | Yaniv et al. | ................. 280/733 |
| 5,851,055 A | * | 12/1998 | Lewis | ......................... 280/733 |
| 6,142,511 A | * | 11/2000 | Lewis | ......................... 280/733 |
| 6,244,621 B1 | * | 6/2001 | Kameyoshi et al. | ......... 280/733 |

FOREIGN PATENT DOCUMENTS

JP    2000-108832    *    4/2000

* cited by examiner

*Primary Examiner*—Peter C. English
(74) *Attorney, Agent, or Firm*—Jerry Holden

(57) ABSTRACT

An inflatable belt system and method of operation for a vehicle occupant restraint in which a lap belt section or torso belt section or both have dual load bearing portions with an inner portion being inflatable. During inflation of the inner portion the other outer belt portion ruptures along a frangible line. The outer belt portion is a woven cylindrical member.

23 Claims, 12 Drawing Sheets

BELT SYSTEM WITH INFLATABLE SECTION WITHIN AN OUTER BELT SECTION AND METHOD OF RESTRAINT

This application is a continuation of U.S. patent application Ser. No. 09/099,858 filed Jun. 18, 1998, abandoned.

BACKGROUND OF INVENTION

Inflatable seat belts have included perforated fabrics (U.S. Pat. No. 3,801,156). Other seat belts have included folded woven fabric bodies within a rupturable cover (U.S. Pat. Nos. 5,346,250 and 5,383,713). Inflatable seat belts have also been pleated and stitched for use prior to inflation (U.S. Pat. No. 3,866,940).

Prior inflatable seat belts have included decorative covers that had little or no load bearing ability. Further, the attachment between the inflatable sections and the non-inflatable sections lacked sufficient reinforcement to withstand the high loading occurring during a crash.

SUMMARY OF THE INVENTION

Broadly, the preferred embodiment of the present invention comprises a vehicle seat and seat belt system including a two-part torso belt section with an inflatable inner component inserted into and coextensive with an outer component. The outer component comprises a tubular webbing made of fabric or other suitable material having strength characteristics similar to conventional seat belting. The tubular form of the outer component is formed by weaving two opposite edges of the webbing with a frangible seam that is designed to rupture when the inflatable inner component is inflated. However, even when the outer component seam is ruptured, the webbing still continues to act as a conventional seat belt. It remains attached at both ends in a manner similar to the manner in which conventional seat belts are attached.

The inflatable inner component comprises an inflatable tube, bladder or other inflatable component positioned co-extensively within the tubular webbing of the outer component. The frangible seam or knitted catch cord of the outer component allows the inner inflatable component, as it inflates, to exit the outer component through a rupture opening in the tubular webbing during the period of vehicle deceleration pending a crash. A dynamic crash event occurs when the vehicle is in motion when it encounters a crash or collision. A static crash event occurs when the vehicle is stationary when something else crashes into or collides with it.

The expansion pressure and forces of the inflation of the inner component cause the frangible seam of the tubular webbing of the outer component to rupture due to the shearing of the catch cord. The inner inflatable component, when inflated, also acts in a similar manner to the outer component, with both components acting in a manner similar to a conventional seat belt. That is to say that both the inflated inner inflatable component and the outer component are capable of bearing the tensile load impressed thereon by a passenger's deceleration in a crash event.

The inner inflatable component, additionally, functionally acts as an air bag, to spread the load and cushion the passenger during that crash event. The combination of outer component and inner inflatable component may also be used in a lap belt section of a seat belt, as well as in the torso belt section.

The belt system may be used in combination with a structural seat having a frame in which a belt enclosure and anchor are positioned behind the occupant and secured to the seat frame. The enclosure houses the torso belt section of the system, which includes the outer and inner inflatable components. An inflator is positioned within the inner inflatable component. The amount of belting withdrawn from the enclosure depends on the size.-and/or shape of the occupant as he or she buckles up. Alternatively, the belt enclosure and anchor may be mounted on other portions of the vehicle including its frame.

These and other advantages are more fully explained in the following drawings and detailed description.

DETAILED DESCRIPTION OF THE INVENTION

Figure 1:
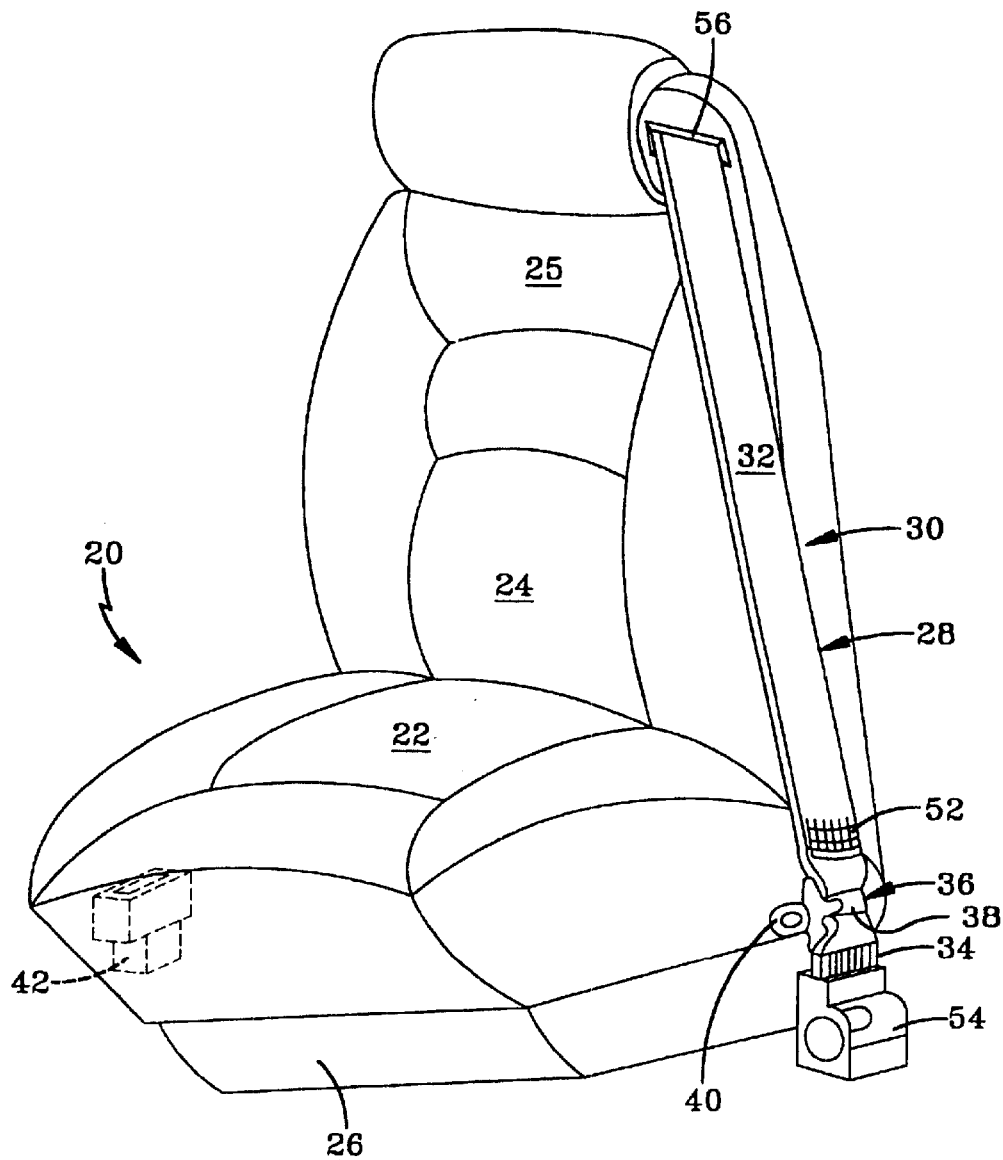
FIG. 1 is a perspective view of the vehicle seat with a belt system of the present invention.

Referring to the Figures by the characters of reference there is illustrated a vehicle structural seat 20 having a seat portion 22, a back portion 24, an upper back portion 25, and a base portion 26. The vehicle structural seat 20 is described in U.S. Pat. No. 5,851,055 issued Dec. 22, 1998, to Donald J. Lewis entitled "Inflatable Passenger-Size Adjustable Torso Belt System Including Enclosure Mount and Method of Passenger Restraint" and assigned to a common assignee. This patent is incorporated herein by reference.

Figure 3:
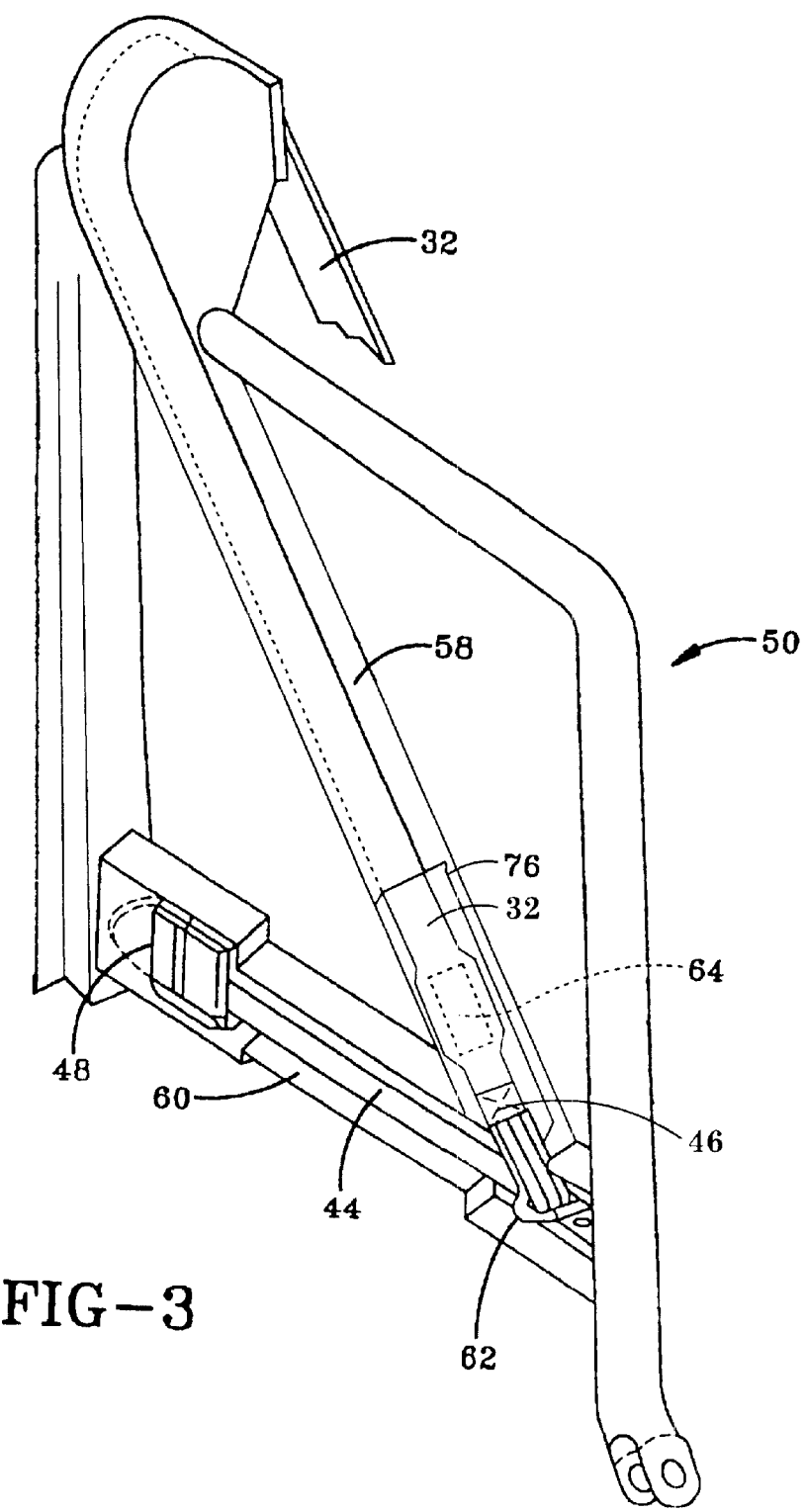
FIG. 3 is a rear perspective view of the seat frame, rear belt enclosure and anchor mounted to the seat.

Mounted to the seat 20 is a belt system 28 having an occupant restraint belt 30 a torso belt section 32 and a lap belt section 34. The torso belt section 32 has a tongue connector 36 with a belt holding opening 38 and a tongue 40. The torso belt section 32 has, in its unbuckled mode, two ends with one end connected through a rear belt portion 44 to a rear retractor and payout anchor reel 48. The payout anchor reel 48 is positioned be hind the back portion 24 and upper back portion 25 on a scat frame 50 (FIG. 3).

One end of the lap belt section 34 is adapted to be connected to a side anchored buckle receiver 42 with the tongue 40 (FIG. 1). The torso belt section 32 reciprocally moves in a belt guide enclosure 58 as the length of the rear belt portion 44 pays out and retracts back into rear retractor and payout anchor reel 48. The belt guide enclosure 58 includes a horizontal enclosure section 60 secured to the seat frame 50 and an upper enclosure slot 56.

The torso belt section 32 includes the tandemly connected rear belt portion 44, which changes direction as it passes around the guide D-ring 62 located within the horizontal enclosure section 60. The guide D-ring 62 is mounted to the seat frame 50. In its unbuckled mode, the torso belt section 32 extends from a belt stitching or a means of attachment 52 adjacent a seat side reel anchor 54, upwardly alongside the occupant's torso into the enclosure slot 56. The torso belt section 32 is attached to the rear belt portion 44 by another stitching or a means of attachment 46. The rear belt portion 44 is preferably made of conventional seat belt webbing.

An inflator 64 is held within the torso belt section 32 and within the belt guide enclosure 58 and moves along with the torso belt section 32 as it reciprocates. The position of the inflator 64 in the buckled-up mode therefore depends on the amount of the torso belt section 32 utilized by the occupant as he or she buckles up; that amount varies with the occupant's size and shape.

Figure 4:
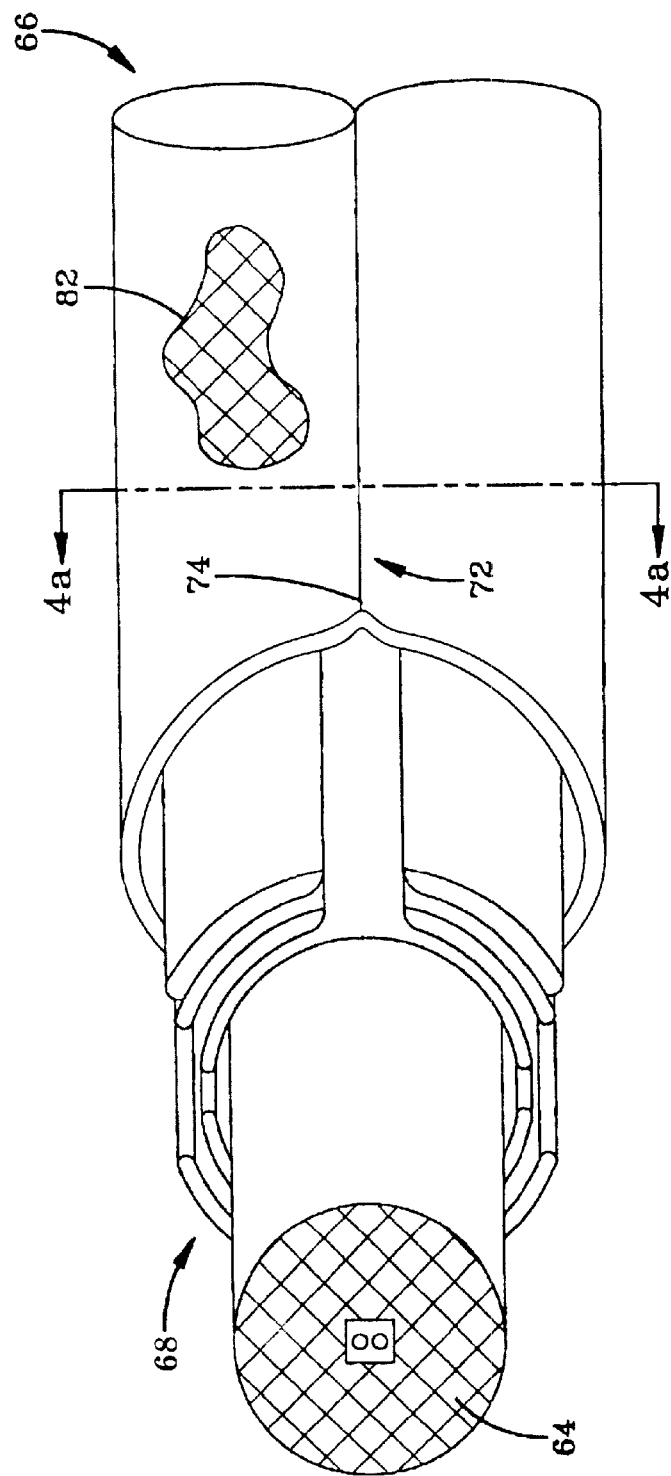
FIG. 4 is a broken-away perspective view of that portion of the belt including an inflator which portion resides in the belt enclosure.
Figure 5:
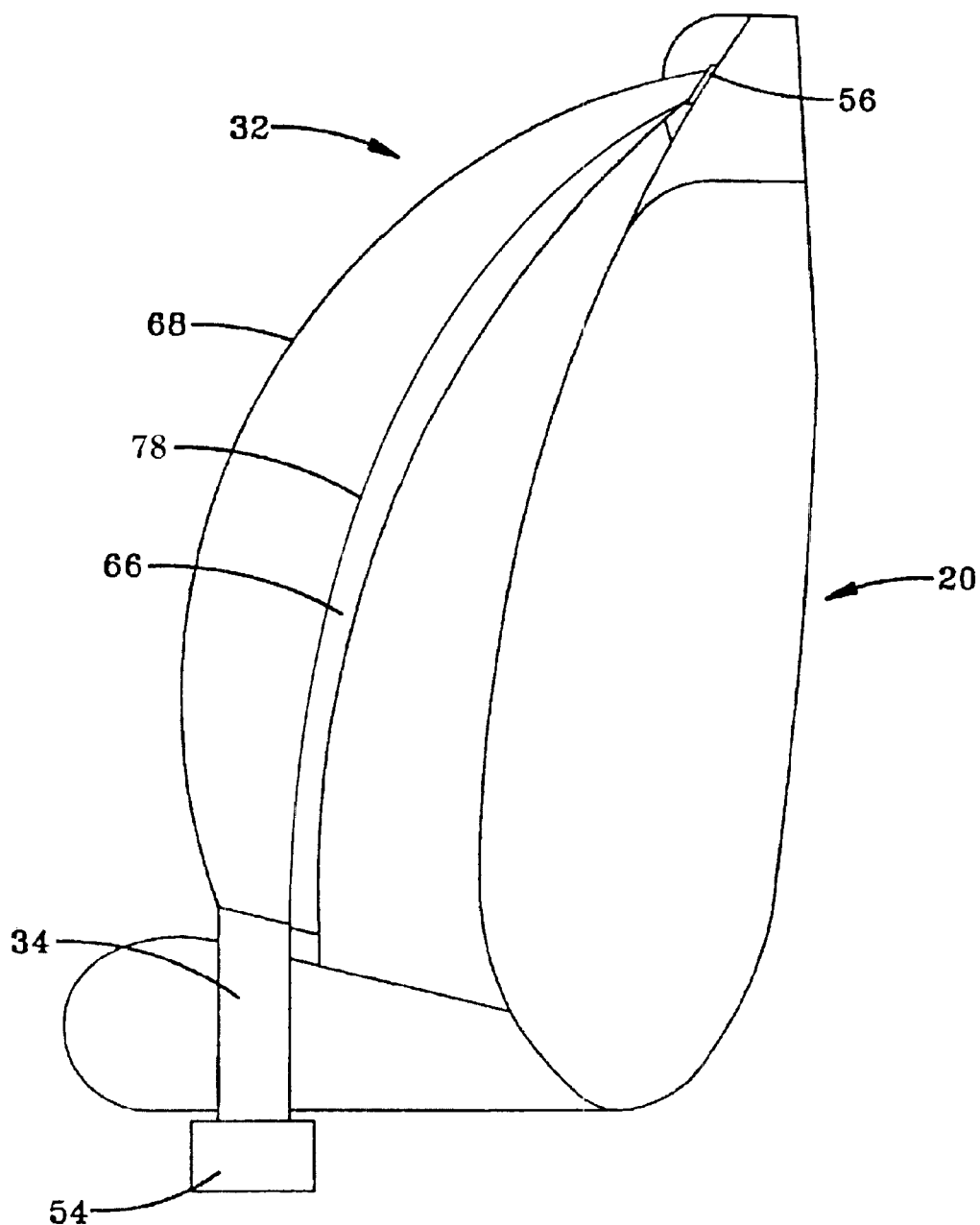
FIG. 5 is a perspective view of the seat of FIG. 1 with the torso section of the belt system inflated.
Figure 6:
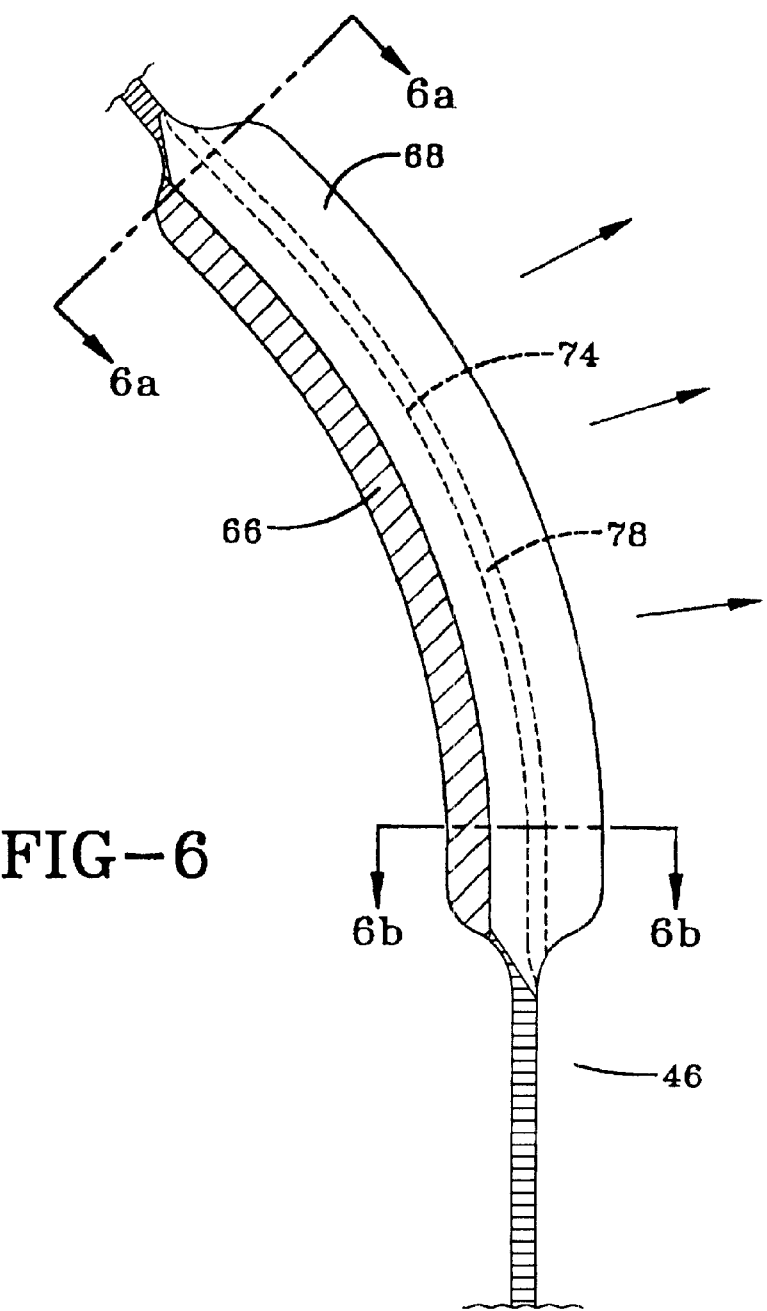
FIG. 6 is a sectional view of the inflated torso belt section.
Figure 6A:
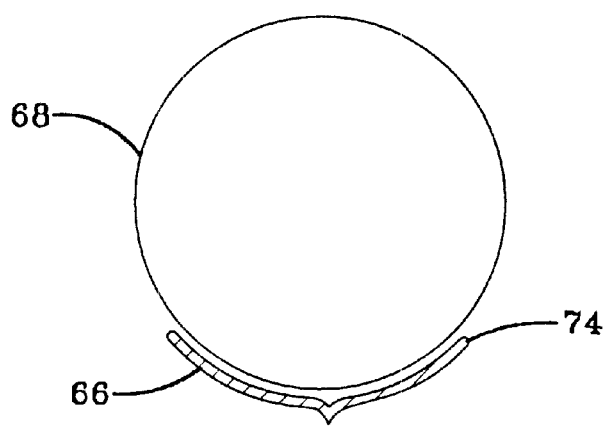
FIG. 6a is a view along line 6a—6a of FIG. 6.
Figure 6B:
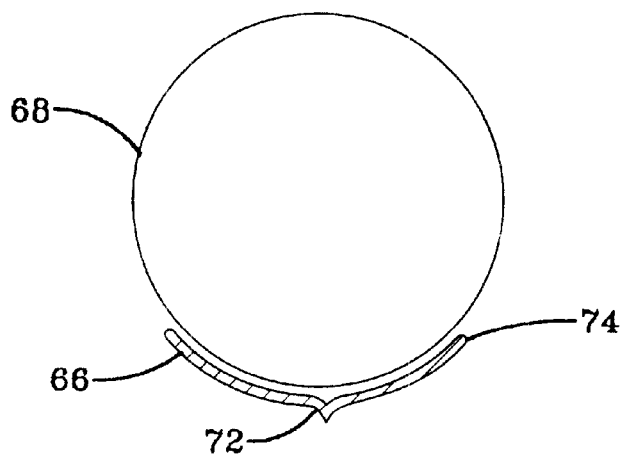
FIG. 6b is a view along line 6b—6b of FIG. 6.

Turning now to FIGS. 4–6, the torso belt section 32 includes an outer tubular belt component 66 and an inner inflatable tubular belt component 68 that is folded for storage within the outer belt component 66. The diameter of the inner belt component 68, when inflated, is typically three to four times the width of the outer belt component 66 when the outer belt component has been ruptured and spread out in the manner shown in FIGS. 6a and 6b. In FIG. 6a, the outer belt component is partially folded over itself after rupturing. A diameter to width ratio as high as five or six to one is acceptable. The outer belt component 66 may be formed by weaving a cylindrical member, typically having an oval cross-section.

Figure 4A:
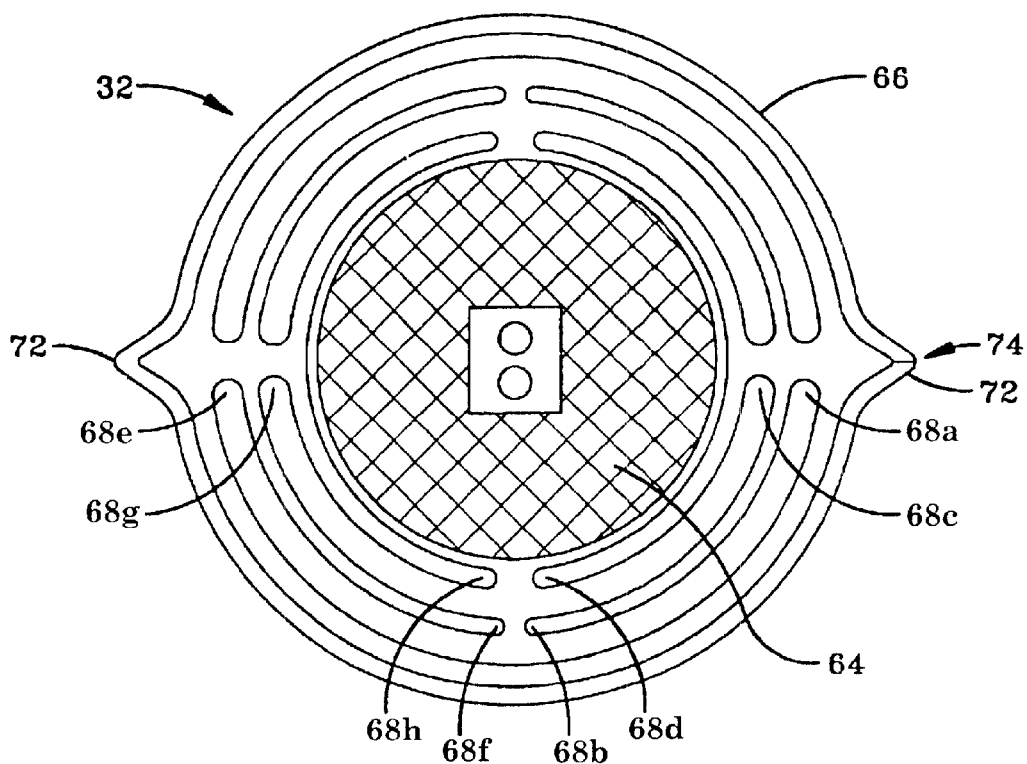
FIG. 4a is a sectional view taken along line 4a—4a of FIGS. 4 and 7.
Figure 4B:
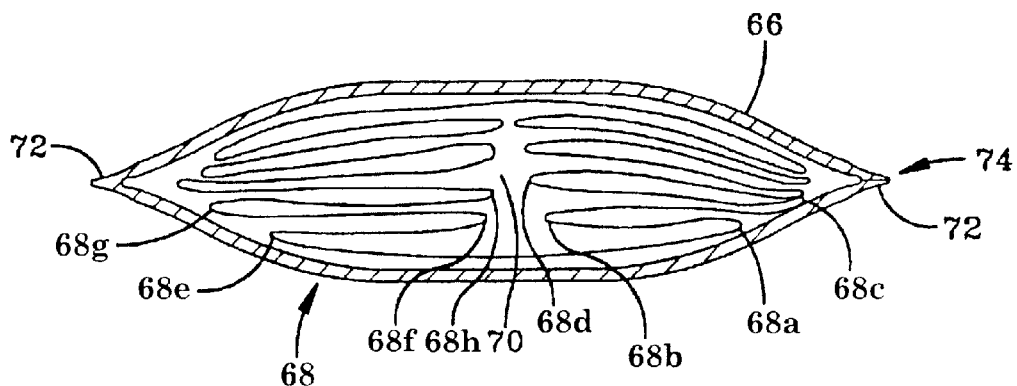
FIG. 4b is a sectional view taken along line 4b—4b of FIGS. 2 and 7.

The inner belt component 68 as stored includes one or more folds 68a–68h as illustrated in FIGS. 4a–4b. FIG. 4a illustrates a cross section of torso belt section 32 within belt guide enclosure 58, including a cross section of inflator 64. FIG. 4b shows an uninflated cross section of the torso belt section 32 across the occupant's torso and an open passageway 70 extending longitudinally along the axis of the folds of the inner belt component 68. This passageway 70 provides a flow path for the gas output of the inflator 64 to the belt stitching 52.

The outer belt component 66 has a projection 72 on either side. A frangible line 74 lies in one of the projections 72. Inflation of the torso belt section 32, specifically inflation of inner belt component 68, should be to a sufficient diameter and length to push the occupant back in his or her seat, but not so large so as to create a danger of injury. As a crash event loads the torso belt section 32, the load is shared by both the outer belt component 66 and the inner belt component 68. An increasing amount of the load is transferred to the inner belt component 68 as it becomes inflated.

Depending upon the size and shape of the seat occupant, partial inflation occurs in a portion of torso belt section 32, that is contained in the inner wall 76 of the belt guide enclosure 58. Full inflation of the torso belt section 32 that is contained within the belt guide enclosure 58 is restrained.

In the first and earliest phase of a crash, the inflator 64 is actuated to supply gases to the inner belt component 68 to flow along the passageway 70. The gases start to inflate the inner belt component 68 for exerting pressure on the inner walls of outer belt component 66. When the pressure reaches a certain level the outer belt component 66 ruptures along the frangible line 74 and the inner belt component 68 starts to exit through the ruptured area 78 (FIG. 5). The frangible line 74 extends longitudinally along a single edge of the outer belt component 66 about at the location of one of the projections 72 (FIG. 4a). It is a function of the frangible line 74 to provide length and direction to the exiting of the inner belt component 68.

As the vehicle and occupant deceleration continues, the outer belt component 66 begins to stretch due to load forces created by the occupant. At the same time the inner belt component 68 begins to pretension and foreshorten as it takes up an increasing portion of the load. In the next phase when the inflating inner belt component 68 has deployed further, it takes more of the load and the outer belt component 66 carries less of the load. Finally, when the inner belt component 68 is fully deployed, it assumes a significant share of the load. The inner belt component 68 is preferably designed to be capable of handling from about 60% to as high as about 90% of the load. Since the outer tubular and inner inflatable tubular components 66, 68 share the crash load, each can be made of a thinner and lighter material than is conventionally used for vehicle seat belting. The inner belt component 68 and the outer belt component 66 may be made of any suitable material. The preferred material is woven fabric such as from polyester or nylon fibers or threads. The fabric of the outer belt component 66 preferably has a tensile strength between 3,000 lbs. to 6,700 lbs. and an elongation of less than 10% under a tensile strength of 2,500 lbs. A frangible warp fiber 80, located along the frangible line 74 has a relatively low denier of fifty to four hundred twenty.

Except where restricted by the belt guide enclosure 58, full inflation of the torso belt section 32 occurs between the belt stitching 52 (FIG. 1) and the stitching 46 (FIG. 3). The inflation of the inner belt component 68 and its deployment outside outer belt component 66 occurs between belt stitching 52 and the enclosure slot 56.

FIGS. 6, 6a, 6b and 6c show the inner belt component 68 deployed through the ruptured area 78 formed by the rupture of the outer belt component 66. Limited inflation occurs within the belt guide enclosure 58 using some of the amount of gas discharged by the inflator 64. However, the great majority of gases provided by the inflator 64 inflate the portion of the inner belt component 68 for torso restraint.

Figure 6C:
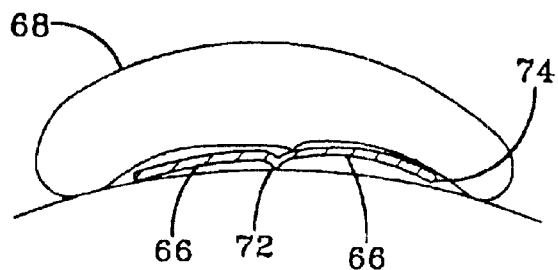
FIG. 6c is a sectional view similar to FIG. 6b after inflation.

FIG. 6c shows the operation of deployed inner inflatable belt component 68 fully inflated and with the full stress of the decelerating seat occupant imposed upon it. The outer belt component 66 is in a fully stretched out posture, after frangible line 74 has fully ruptured. The inner belt component 68 is exerting restraint upon the occupant's torso to arrest forward torso movement beyond the fully stretched out width of ruptured outer belt component 66. The shape of inflated inner belt component 68, as shown in FIG. 6c, is changed from circular to oval shaped by the forces required to arrest the occupant's forward torso movement. In FIG. 5, the outer tubular component 66 is somewhat banana-shaped due to the small elongation of the outer belt component.

Figure 7:
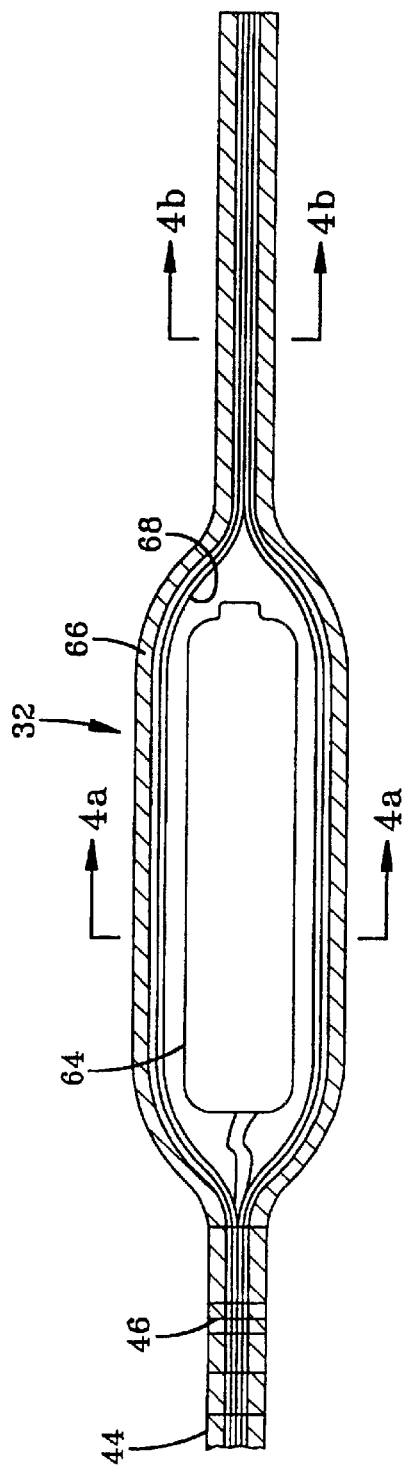
FIG. 7 is a sectional view of the torso belt portion prior to activation of the inflator.

FIG. 7 illustrates a portion of the torso belt section 32 within the belt guide enclosure 58, including the inflator 64.

Figure 8:
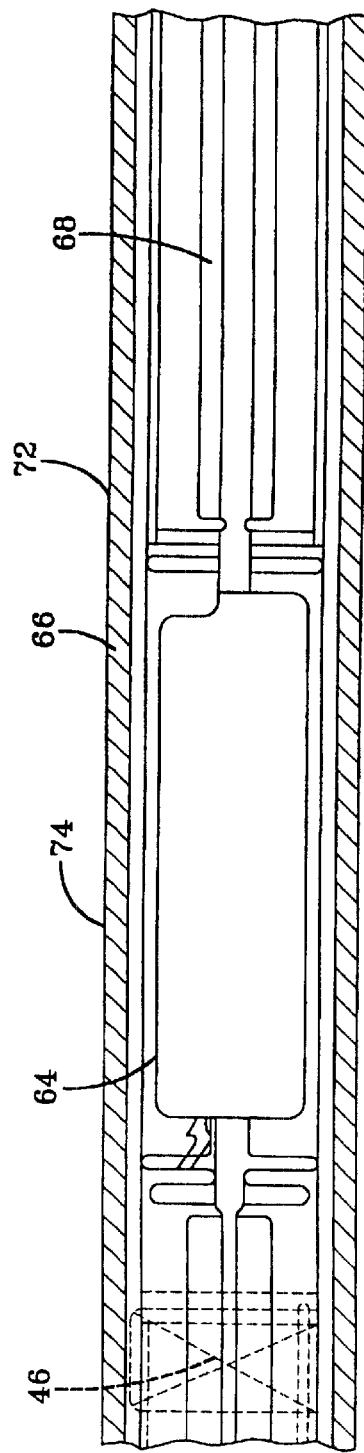
FIG. 8 is an enlarged view of the torso belt with a tubular outer component and inner component readied for expansion by the inflator.

FIG. 8 is a sectional view of the portion of torso belt section 32 that is within the belt guide enclosure 58, not shown, including the inflator 64. It is the inner wall 76 of the belt guide enclosure 58 that partially confines the inflation of the inner belt component 68, preventing the rupture of that portion of the frangible line 74 within the belt guide enclosure 58.

Figure 9:
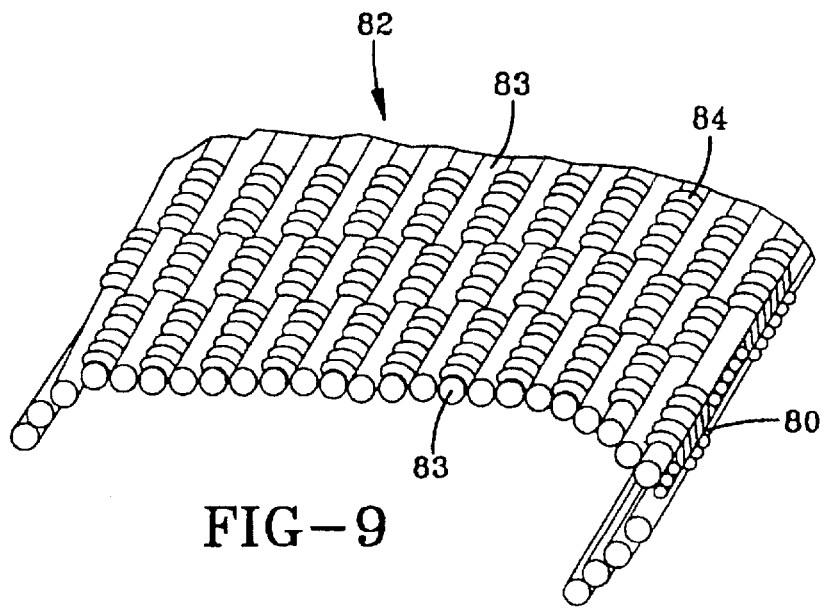
FIG. 9 is a perspective view of a portion of the fabric of the outer tubular belt component.

FIG. 9 shows a portion of a woven fabric 82 of the outer belt component 66. The longitudinal fibers 83 and the cross fill fibers 84 form a hollow tubular member. One method of making the hollow tubular member is by weaving a tube with a longitudinal frangible warp fiber 80 that comprises the frangible line 74 as discussed above. The longitudinal frangible warp fiber 80 fails due to tension in the cross fill fibers 84. In this embodiment, the longitudinal frangible warp fiber 80 comprises the frangible line 74 as discussed above.

Figure 10:
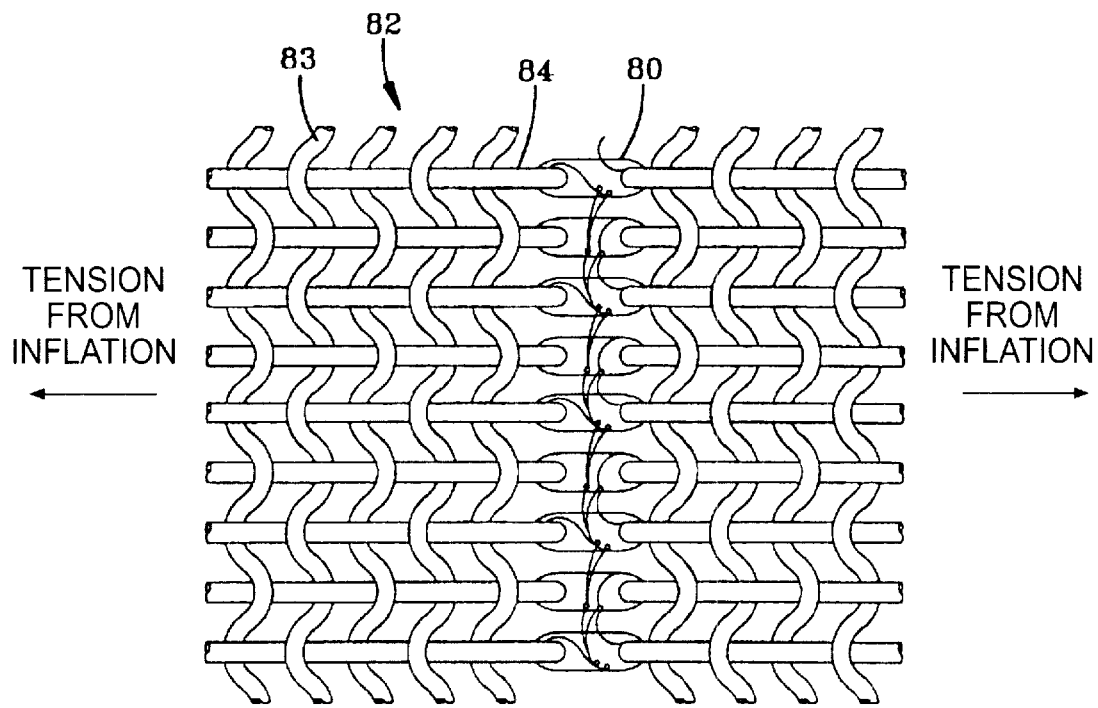
FIG. 10 is a plan view of a portion of the fabric of the outer tubular belt component illustrating the frangible thread or catch cord.

FIG. 10 is an enlarged view of the woven fabric 82 as shown in FIG. 9. Inflation causes the cross fill fibers 84 to tighten and pull on the longitudinal frangible warp fiber 80, in a direction perpendicular to the longitudinal alignment of the frangible warp fiber 80. This causes it to break or rupture, creating the longitudinal ruptured area 78 as indicated in FIGS. 5 and 6. In the alternative, the frangible warp fiber 80 may be a woven or knitted catch cord having a lower denier than that in the remaining longitudinal fibers. The denier should be low enough such that the catch cord breaks in shear when 10–20 psi stress is exerted on it.

Figure 11:
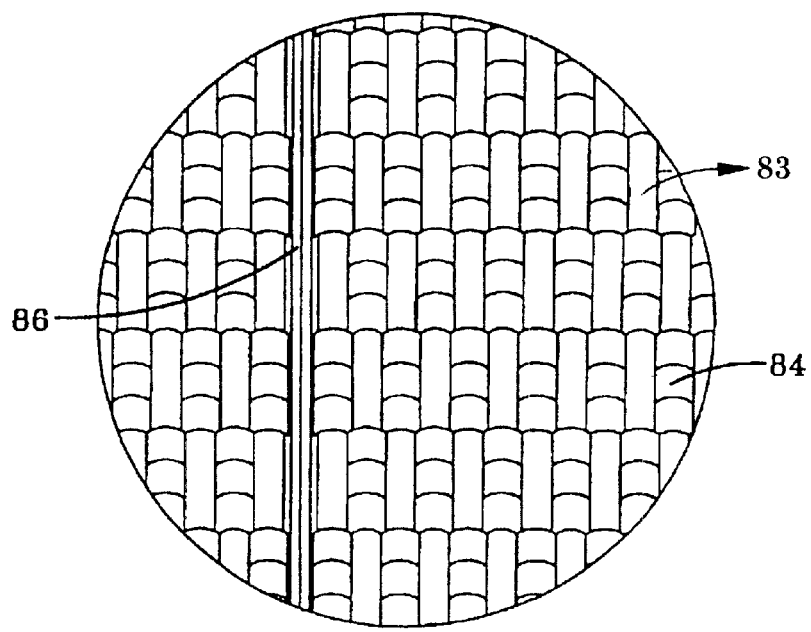
FIG. 11 is a plan view of a portion of an alternative fabric of the outer belt component.
Figure 12:
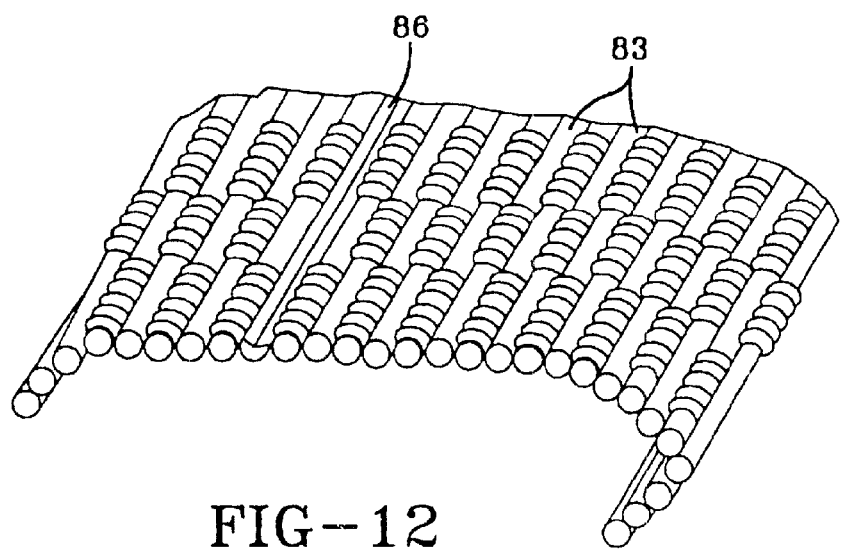
FIG. 12 is a perspective view of the alternative fabric.

FIGS. 11 and 12 show an alternative arrangement for providing internal pressure induced rupture of the outer belt component 66. A seam 86 appears as a longitudinal line that may be formed by pre-weakening the fiber with, e.g., chemical etch, laser light, a hot knife, a hot wire, a water jet, etc., to establish a weakened area for rupture or tear line in the fabric. In order to make the seam, the outer belt component 66 must be turned inside out. Once the line is made, the outer belt component is then turned inside out so that the seam is on the inside. Alternatively, fibers can be weakened by reduction of fiber cross-section. The cross or fill fibers 84 are in a direction perpendicular to the longitudinal direction of the seam 86.

When initially installing the belt system 28 on the vehicle seat 20, care is taken to see that the frangible line 74 is properly positioned. It is important that when the belt system inflates, the rupture area 78 is along the outside of the occupant away from the occupant's body midline. The function of the frangible warp fiber 80 or the catch cord is to direct and control the extent of the exit of the inflated inner belt component 68.

In the preferred embodiment, the outer belt component 66 is a single piece structure woven on a needle and/or shuttle loom in such a fashion as to split the sheds creating one continuous oval or cylindrical shape hollow structure closed by a woven and/or knitted catch cord. The catch cord may be a No. 5 Mueller design of course the outer belt component 66 may be a flat piece of woven fabric that has its sides sewn or knitted together with the frangible warp fiber 80 being the thread.

Figure 13:
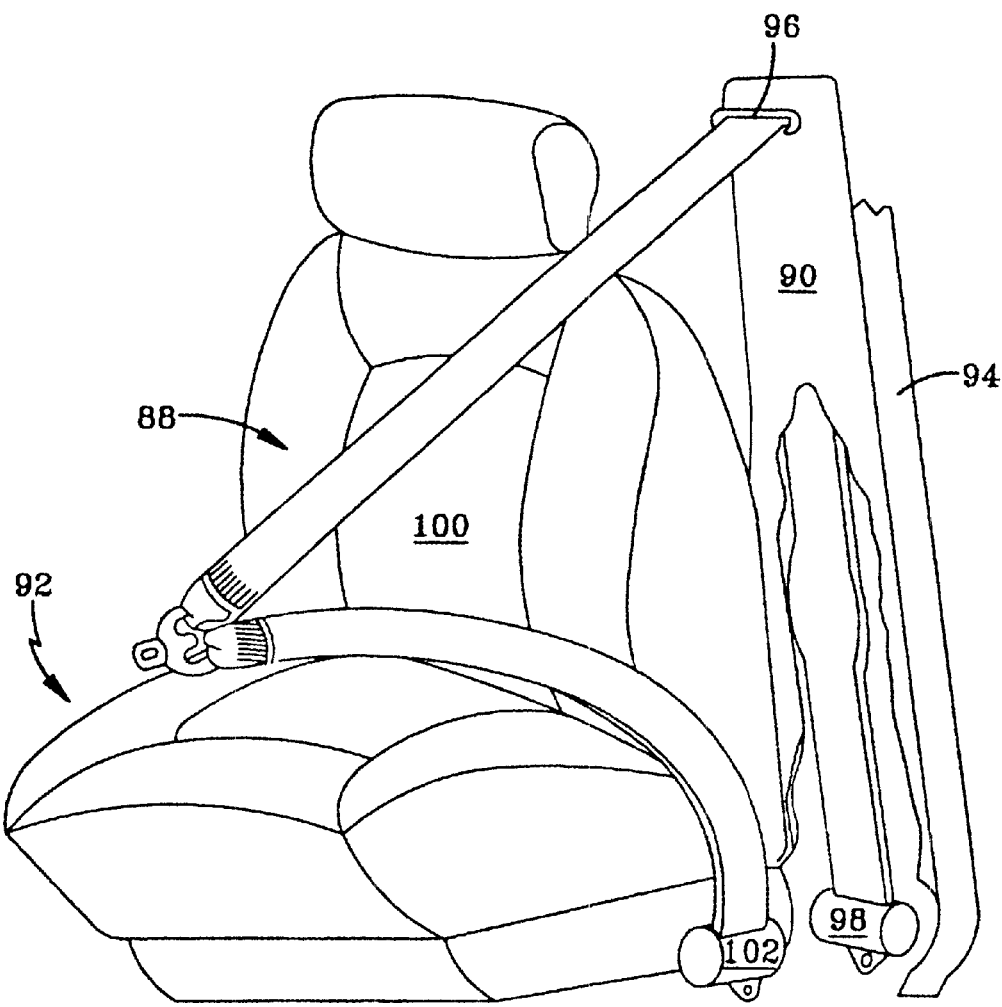
FIG. 13 is a perspective view of another embodiment wherein the belt enclosure is mounted adjacent the seat on the vehicle frame.

Turning to FIG. 13, an alternative embodiment of the present invention is shown in which an occupant restraint belt 88 passes into an enclosure 90 positioned adjacent the vehicle structural seat 92. The enclosure 90 is attached to the vehicle "B" pillar 94. The enclosure 90 includes an upper slot opening 96 and a vehicle frame-mounted belt retractor and payout anchor 98. The terms "frame-mounted" and "vehicle frame" as used herein include "unibody" construction where the vehicle body and floor act as the structural frame of the vehicle, as well as vehicle construction that includes a separable distinct frame assembly. Also illustrated are the vehicle structural seat 92, the back portion 100 and the seat side reel anchor 102. This embodiment lends itself to retrofitting vehicles that were originally manufactured and assembled without the present invention.

Figure 2:
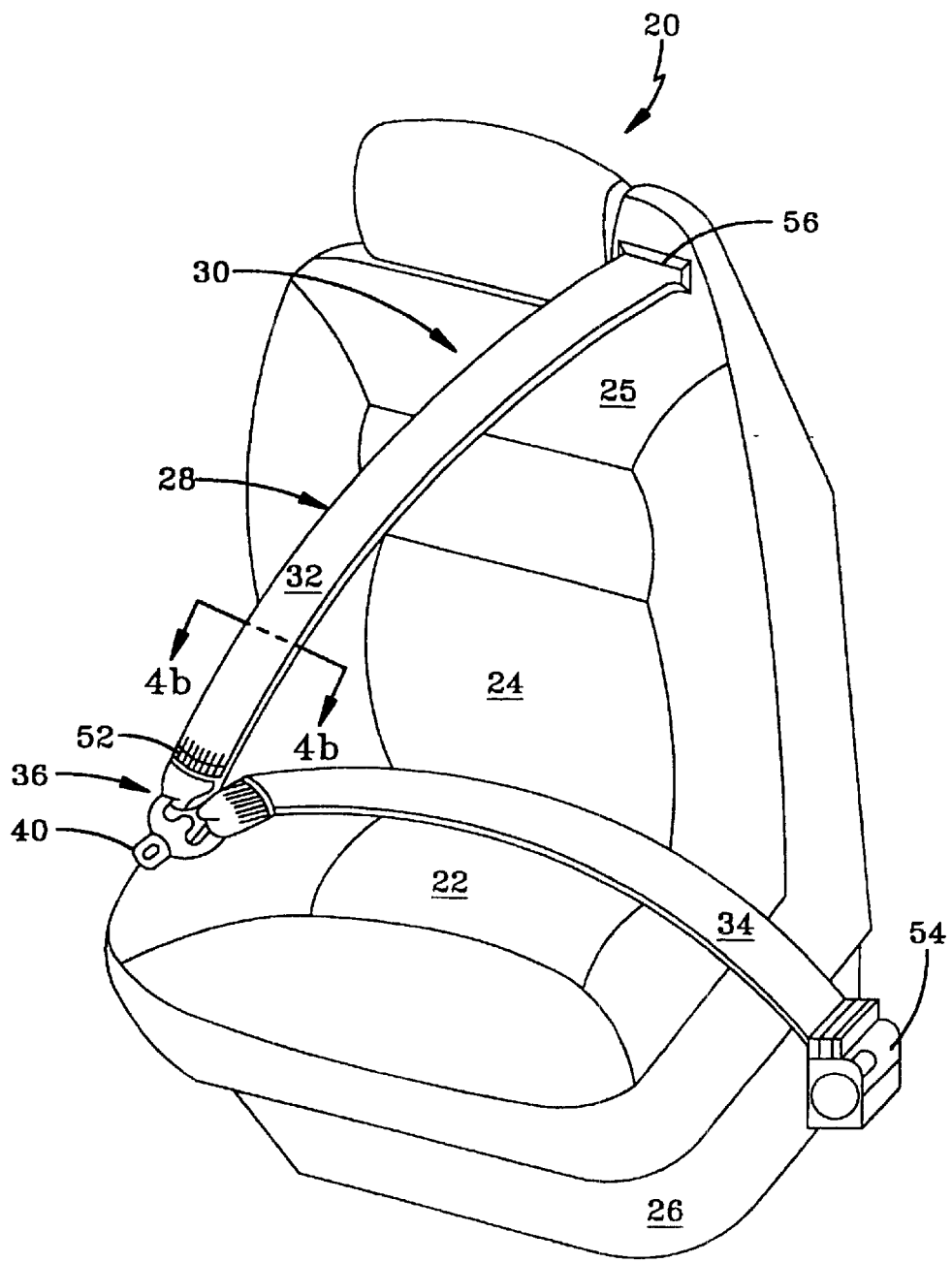
FIG. 2 is the same view of FIG. 1 in which the belt system is buckled up around the occupant.

In operation of the occupant restraint belt 30, an occupant sits in vehicle structural seat 20, pulls the tongue connector 36 over his or her lap, and inserts the tongue 40 in the buckle receiver 42 (FIG. 1). The torso belt section 32 including its rear belt portion 44 pays out of the rear retractor pay-out anchor reel 48 and the lap belt section 34 pays out of the seat side reel anchor 54. The inflatable torso belt section 32 which pays out of the rear retractor pay-out anchor reel 48 exits guide enclosure slot 56, in upper seat back portion 25 (FIG. 2). The occupant restraint belt 30 is designed so that the inflator 64 and a length of the attached rear belt portion 44 remain in the belt guide enclosure 58, even when the largest occupant is being accommodated. The arrangement of the belt guide enclosure 58 and the enclosure slot 56 are such that they function to maintain the inflator 64, at all times, within the belt guide enclosure 58.

In further operation of the system, during a crash event when the vehicle experiences rapid deceleration, a crash sensor (not shown) activates the inflator 64 which discharges gases into the passageway 70 of the inner belt component 68. The rear retractor payout anchor reel 48 and the seat side reel anchor 54 lock up preventing any additional belt pay out. Since the inflator 64 is located in belt guide enclosure 58 behind vehicle structural seat 20 or, in the enclosure 90, the gases first discharged from the inflator 64 expand inner belt component 68 within the confines of the belt guide enclosure 58 or enclosure 90. Since the belt guide enclosure 58 restrains the inflation of the inner belt component 68, it does not emerge from the outer belt component 66 even if the outer belt component 66 develops a frangible split due to internal gas pressures.

Once the torso belt section 32 in the belt guide enclosure 58 has been inflated to the extent permissible, further discharged gases inflate the torso belt section 32 outside the belt guide enclosure 58 and adjacent the occupant's torso. When pressure in the torso belt section 32 outside the belt guide enclosure 58 reaches a certain level, the frangible line 74 in the outer belt component 66 breaks, causing it to rupture to form the ruptured area 78. The rupture begins at the weakest point and then rapidly rupturing along the longitudinal length of the outer belt component 66 between the enclosure slot 56 and the belt stitching 52. Where the preferred embodiment of the frangible line 74 is utilized, the frangible warp fiber 80 preferably (but not necessarily) varies in strength along its length with its weaker portion being at the lower torso end adjacent the belt stitching 52 remote from the area of occupant's head and enclosure slot 56. Such variation in fiber strength causes emergence of the inner belt component 68 preferably at the area just above belt stitching 52 prior to its emergence at the area adjacent the occupant's head.

The variation in strength of the frangible warp fiber 80 along its length can be effected by, for example, varying its thickness along its length. During vehicle deceleration and phases of inflation of the torso belt section 32, as previously described, the system functions to decelerate the occupant as follows:

1. Under normal driving conditions, the outer belt component 66 is in engagement with the occupant's torso and resists and counteracts the occupant's forward and lateral motion. The area (width times length) of the outer belt component 66 that is initially loaded by occupant's movement, is an area equal to or substantially equal to its area in contact with the occupant prior to any inflation. Such an area is typically in the range of about fifty to seventy square inches.

2. Upon the onset of inflation of the inner belt component 68 and the rupture of outer belt component 66, the outer belt component 66 is reduced slightly in tensile strength due to the ruptured area 78 eliminating the complete radial integrity of the tubular structure. As the occupant is decelerated, the outer belt component 66 elongates somewhat and narrows slightly, due to the ruptured area 78 eliminating radial integrity of the tubular structure.

3. As the outer belt component 66 elongates and narrows, the inner belt component 68 is expanding laterally as it is inflated causing it to shorten. Further, the inner belt component 68, as it shortens, is subjected to an increasing amount of load exerted by the occupant. This load can become greater than the load on the outer belt component 66 which has been ruptured.

4. By the time the inner belt component 68 is fully inflated and the occupant deceleration is reaching a point where a maximum load is being placed on belt system 28, the inflated inner belt component 68 serves as a substantial portion of the occupant restraint. The inner belt component 68, made of fabric or material similar or identical to that of the outer belt component 66, stretches as it is loaded. This stretching provides, in its inflated state, a cushioning and load limiting effect against the occupant's torso. The overall cushioning effect is produced by the stretch of the fiber of both the inner belt component 68 and the outer belt component 66, as well as the inflation gas in inner belt component 68. Upon full inflation, the overall area of belt system 28 in contact with the torso, including both the inflated inner belt component 68 and the outer belt component 66, is typically in the range of about 150–180 square inches. This may vary depending on the width of the webbing of the inner belt component 68 and the size and/or shape of the occupant. As shown in FIG. 6c, the inflated inner belt will flatten across the occupant's torso as it cushions the occupant during the collision. Typically, about one-third of the circumference of the inflated inner belt component 68, at a minimum, flattens across the occupant, as indicated in FIG. 6c. Both the outer tubular component 66 and the inner belt component 68 are constructed so that neither breaks or fills when loaded during operation of the belt system 28 of the present invention. The belt components stretch or elongate when loaded but do not fail.

Advantages to the two-component occupant restraint belts 30, 88 of the present invention are to eliminate the non-load-bearing decorative cover. This is accomplished by the webbing of the outer belt component 66 acting as a load bearing member as well as the outer cover. By implementation of the two-component system of the present invention, the load to the inner belt component 68 is reduced in comparison to known systems where only the inflatable belt bears the load. Thus, because of the reduced load in the present invention, lighter weight (<6.0 oz/square yard), lower denier ($\leq$210 denier), and reduced thickness ($\leq$0.009") fabrics may be used for the inner belt component 68. Also, the webbing of outer belt component 66 acts as reinforcement for the sewn attachment means, the belt stitching 46, of the inner belt component 68 to rear belt portion 44.

Because the yarn used in the manufacture of the webbing of the outer belt component is larger (500 to 1300 denier) than that of the fabric of inner belt component ($\leq$210 denier), the webbing of the outer belt component better resists the tearing load action to the stitching 46 and the belt stitching 52, induced by the pressure created by the inflator 64 as it inflates the inner belt component, and also as the full load is imposed upon occupant restraint belt 30 by the crash event.

The outer belt component 66 and the inner belt component 68 may be designed to have relative resistance to further elongation as loaded so that the percent of tensile loading on the outer belt component, after rupturing and elongation, has a determined tensile strength range with a median range. Likewise the percent tensile loading on the already inflated inner belt component 68 may be designed to have a determined tensile strength range with a median range. The combination of the two median ranges should equal 100% of the design tensile strength of occupant restraint belt 30. This is also the case for any point in time during the crash event; thus the combined medians should always equal 100% of the design tensile strength for any point during the crash event, although the percentage, for each separate component 66 and 68 of the overall 100% may vary as the crash event proceeds from beginning to end; from the initial deceleration to maximum loading.

Since both outer belt component 66 and inner belt component 68, in combination serve to carry the loads imposed during deceleration, the material of each separate component can be made thinner and lighter than the material used to produce conventional seat belts. Inflation rates and amounts and the extent of inflation of inner belt component 68 may be varied by varying the size, thickness and weight of both inner belt component 68 and outer belt component 66, and by selecting the inflator 64 to be of varying type, size and output. While it is preferred that outer belt component 66 carry most of the initial load prior to its rupture caused by inflation of inner belt component 68, other load sharing between such components may be provided by design. Upon inflation and rupture, it is preferred that the inner belt component 68 takes increasingly more and more of the load as the crash event continues from initiation to conclusion. Upon the maximum load being applied during the crash, it is preferred that inflated inner belt component 68 carry a significant share, in some cases over half of such load and be design capable of carrying up to ninety per cent (90%) of such load.

When occupant restraint belt 30 is in normal use with the occupant buckled up, the torso belt section 32 visible to the occupant has an appearance similar to that of a conventional vehicle seat belt torso belt section.

The outer belt component 66 preferably has the physical properties of:

(1) tensile strength of 3,000–6,7000 lbs.;
(2) elongation of 7–10% at 2,500 lbs.; and
(3) thickness of 0.025–0.060 inches, all similar to conventional seat belt webbing. However, any suitable material can be used provided it can withstand the initial loads, until inner belt component 68 takes up the load burden upon inflation, and provided it is readily scorable, or can otherwise be weakened to form the frangible line 74, to accomplish proper rupture during inflation as discussed above. The outer belt component 66 preferably includes as a frangible line 74 a relatively low denier (50 to 420) woven frangible warp fiber 80. The cross or fill fibers 84, positioned at approximately right angles to the warp fibers in the fabric cause the frangible warp fiber 80 to fail when inflation occurs by the fill fibers 84 pulling laterally on the frangible warp fiber 80.

The webbing of the outer belt component 66 ranges in thickness from 0.035 inches to 0.055 inches and ranges in width from 1.875 inches to 2.5 inches when doubled over to form a tube. That webbing is preferably an uncoated woven polyester hollow webbing. Polyester was chosen as the preferred material for its low elongation and low flammability properties.

The inner tubular component 68 is preferably constructed of a 210 denier or less nylon or polyester woven fabric coated for air retention purposes, preferably with either a thermal plastic polyurethane (for ease of heat sealing) or silicone coating. Preferred fabric characteristics and properties are as follows:

Weave Pattern: Plain, 2:1 Twill, Oxford or Basket
Weight (oz./yd$^2$): 4.5–6.0
Thickness (inches): 0.006–0.009
Tensile Strength (psi): 220–280 (Hoop Direction)
Tensile Strength (psi): 275–325 (Longitudinal Direction)

The diameter of the inner tubular component 68 at about 10 psig inflation pressure is typically about six inches. However, it may range in diameter from about four inches to about ten inches depending upon the size and/or shape of the occupant.

The expansion of inner belt component 68 causes the portion of outer belt component 66 positioned in the belt guide enclosure 58 to engage the inner wall 76 over a distance between the inflator 64 and the enclosure slot 56. This engagement of the inner wall 76 caused by inflation pressure and friction assists in transferring the load to vehicle structural seat 20. The load is distributed diagonally across seat frame 50 substantially over the length of belt guide enclosure 58 as shown in FIG. 3.

The outer belt component 66 remains in contact with the occupant during operation with the inflated inner belt component 68 deploying away from and substantially out of contact with the occupant. The outer belt component 66 provides an insulation layer between the occupant and hot gases that may be expelled from the inflator 64 and utilized to inflate inner belt component 68.

Finally, the dual component belt of the present invention may be utilized in the lap belt section or in both the torso and lap belt sections. A second inflator may be positioned to serve the lap belt section but is not necessary if a run-through D-buckle tongue is employed.

What is claimed is:

1. An inflatable seat belt system, comprising:
 a rear retractor and pay-out anchor mounted to a vehicle seat;
 a belt guide enclosure disposed near the rear retractor and pay-out anchor;
 a belt webbing connected at a first end to and extending from said rear retractor and pay-out anchor to and within said belt guide enclosure;
 an inflator confined within said belt guide enclosure and movable therein coextensively with the pay-out and retraction of said belt webbing;
 an inner inflatable tubular belt component, having a fist end attached to a second end of said belt webbing, wherein said inflatable tubular component surrounds the inflator and extends from said second end of the belt webbing through said belt guide enclosure and beyond an end of said bell guide enclosure which is most remote from The location of said rear retractor and pay-out anchor, said inner inflatable tubular belt component being movable to retract and pay-out co-extensively with the movement of said inflator and said belt webbing;
 an outer tubular belt component having a first end attached to said second end of said belt webbing, said outer tubular belt component surrounds and encompasses said inner inflatable tubular belt component when said inner tubular belt component is not inflated, said outer tubular belt component includes a frangible line extending longitudinally along a side edge of said outer tubular belt component, said frangible line functions to rupture along its length and transform at least a portion of the outer tubular belt component into a non-tubular webbing when said inner inflatable tubular belt component is inflated by said inflator;
 a connector attached to a second end of said inner tubular belt component and a second end of said outer tubular belt component; and
 a lap belt section attached at a first end to said connector and attached at a second end to a side retractor and payout anchor mounted adjacent a side of the vehicle seat such that said side retractor and pay-out anchor is operable to pay-out and retract said lap belt section;
 wherein said outer tubular belt component and said inner inflatable tubular belt component both bear the load of restraining an occupant of the vehicle seat during a crash event as well as during a non-crash event of the vehicle.

2. The inflatable seat belt system of claim 1 wherein during inflation of said inner inflatable tubular belt component, said inner inflatable tubular belt component assumes increasingly more of said load of restraining the occupant during a crash event, while said outer tubular belt component correspondingly assumes decreasingly loss of said load of restraining the occupant during a crash event.

3. The inflatable seat belt system of claim 1 wherein said load of restraining the occupant during a crash event extends over a period of time including a first phase wherein rupture occurs, a second phase of inner inflatable tabular belt component inflation and a final phase wherein the inner inflatable tubular belt component is fully inflated, and the share of the load borne by said outer tubular belt component being reduced during said second phase and into said final phase, and said inflated inner inflatable tubular belt component withstands progressively more of said load during said second phase and into said final phase.

4. The inflatable seat belt system of claim 1, wherein the inner inflatable tubular component has a plurality of folds.

5. An inflatable seat belt system, comprising:
 a retractor and pay-out anchor mounted to a frame of a vehicle associated with a vehicle seat;
 a belt guide enclosure mounted adjacent to the vehicle seat and extending from said retractor and pay-out anchor;
 a belt webbing connected at a first end to and extending from said retractor and pay-out anchor to and within said belt guide enclosure;
 an inflator confined within said belt guide enclosure and movable within the confines of said belt guide enclosure co-extensively with the retraction and payout of said belt webbing to and from said retractor and pay-out anchor;
 an inner inflatable tubular belt component having a first end attached to a second end of said belt webbing, wherein said inner inflatable tubular belt component surrounds said inflator, and extends co-extensively from said belt webbing through said belt guide enclosure beyond an end of said belt guide enclosure that is most remote from the location of said retractor and pay-out anchor, said inner inflatable tubular belt component being movable to retractor and pay-out co-extensively with the movement of said inflator and said belt webbing;

an outer tubular belt component having a first end attached to said second end of said belt webbing, said outer tubular belt component surrounds and encompasses said inner tubular belt component when said inner inflatable tubular belt component is not inflated, said outer tubular belt component includes a frangible line extending longitudinally along a side edge of said outer tubular belt component, said frangible line functions to rupture along its length and transform at least a portion of the outer tubular belt component into a non-tubular webbing when said inner tubular belt component is inflated by said inflator;

a connector attached to a second end of said inner tabular belt component and to a second end of said outer tubular belt component, said connector functions to removably attach both of said second ends to the vehicle seat; and a lap belt section attached at a first end to said connector and attached at a second end to a side retractor and pay-out anchor mounted adjacent a side of the vehicle seat such that said side retractor and pay-out anchor operates to pay-out and retract said lap belt section, wherein said outer tubular belt component and said inner tubular belt component both bear the load of restraining an occupant of the vehicle seat during a crash event as well as during a non-crash event of the vehicle.

6. The inflatable seat belt system of claim 5, wherein the inner inflatable tubular belt component has a plurality of folds.

7. In a vehicle having a seat for an occupant, a belt restraint system comprising:

a belt member restraining the occupant during vehicle deceleration and other movement of the occupant relative to the seat, said belt member being loaded by forces imposed by the occupant;

said belt member including an inflatable torso belt section anchored between a first anchor adjacent the seat and a second anchor behind the seat;

a belt guide enclosure between the occupant and said second anchor;

an inflator in fluid communication with said torso belt section;

said inflatable torso belt section including an outer belt component and an inner belt component:

(i) said components being connected to one another at spaced-apart locations along said torso belt section; and (ii) said components sharing said load forces of said belt member during vehicle deceleration; and said outer belt component having a frangible portion that functions to create an opening when said frangible portion is stressed, said opening through which said inner belt component emerges upon its inflation;

whereby said inflator is disposed inside said inner belt component and inflates said inner belt component upon the vehicle encountering a crash event, causing said frangible portion of said outer component to rupture creating said opening allowing said inner belt component to emerge from said opening to provide an inflated torso belt section; and wherein said inflator and a portion of said inflatable torso belt section are located wherein said belt guide enclosure.

8. The belt restraint system of claim 7 wherein said belt member further comprises a lap belt.

9. The belt restraint system of claim 7 wherein said outer belt component comprises a woven fabric with a plurality of longitudinal warp threads and in which said frangible portion is a warp thread that is weaker than the other of said plurality of longitudinal warp threads.

10. The belt restraint system of claim 9 wherein said weaker thread extends at least across the torso of the occupant to adjacent said first anchor and wherein said weaker thread of said frangible portion is even weaker at the end adjacent said first anchor than at its opposite end.

11. The belt restraint system of claim 9 wherein said vehicle has a frame and wherein said belt guide enclosure is secured to said vehicle frame.

12. The belt restraint system of claim 7 wherein said outer belt component comprises a woven fabric with a plurality of longitudinal warp threads and in which said frangible portion is a knitted catch cord that is weaker than said plurality of longitudinal warp threads.

13. The belt restraint system of claim 7, wherein the inner belt component has a plurality of folds.

14. A method of restraining an occupant in a seat in a vehicle comprising:

providing a woven cylindrical outer tubular belt member anchored at two anchor locations within the vehicle, with the first of said anchor locations being adjacent the seat and the second of said anchor locations being located at a remote location within the vehicle, said woven cylindrical outer tubular belt member adapted to be loaded by the forces required to decelerate the occupant upon deceleration of the vehicle and by other movements of the occupant relative to the seat;

locating within said woven cylindrical outer tubular belt member an inner inflatable tubular belt member, said inner inflatable tubular belt member having two ends and a middle portion with said middle portion extending across at least a portion of the occupant and the two ends of said inner inflatable tubular belt member being secured, respectively, to the corresponding ends of said woven cylindrical outer tubular belt member;

providing as part of said woven cylindrical outer tubular belt member a frangible portion rupturable upon inflation of said inner inflatable tubular belt member so as to permit said inner inflatable tubular belt member to exit said woven cylindrical outer tubular belt member, said woven cylindrical outer tubular belt member and inner tubular belt member substantially share the occupant deceleration load during vehicle deceleration upon the vehicle encountering a crash event;

providing an inflator inside the inner tubular belt member;

providing a belt guide enclosure between the occupant and said remote anchor location, said woven cylindrical outer tubular belt member and said inner inflatable tubular belt member simultaneously reciprocating from and within said belt guide enclosure; and locating said inflator within said belt guide enclosure and in communication with said inner inflatable tubular belt member so that upon a crash event causing deceleration of the vehicle, said inflator inflates said inner inflatable tubular belt member causing it to exit said woven cylindrical outer tubular belt member to assist in decelerating the occupant as the vehicle decelerates.

15. The method of restraining an occupant of claim 14 wherein said woven cylindrical outer tubular belt member and said inner inflatable tubular belt member extend diagonally across the torso of the occupant.

16. The method of restraining an occupant of claim 14 wherein said woven cylindrical outer tubular belt member and said inner inflatable tubular belt member share the load caused by deceleration of the occupant upon the vehicle encountering a dynamic crash event, with said woven cylindrical outer tubular belt member ultimately carrying a lesser load following its rupture, during the course of dynamic crash event caused vehicle deceleration, and said inner inflatable tubular belt member ultimately carrying a greater load after complete inflation.

17. The method of claim 14 said woven cylindrical outer tubular belt member and said inner inflatable tubular belt member have varying relative resistance to further elongation as loaded during the course of deceleration of the occupant upon the vehicle encountering a crash event, such that the percentage of overall tensile loading on said woven cylindrical outer tubular belt member and the percentage of overall tensile loading on said inner inflatable tubular belt member vary constantly during the course of deceleration wherein at all points during said deceleration of the occupant, from initiation to termination, said percentages add up to one hundred percent.

18. The method of claim 14 whereby said woven cylindrical outer tubular belt member and said inner inflatable tubular belt member have relative resistance to further elongation, as loaded by deceleration of the occupant upon the vehicle encountering a crash event, with the resistance to further elongation of said woven cylindrical outer tubular belt member being lessened upon its rupture.

19. The method of claim 14 wherein said woven cylindrical outer tubular belt member comprises fabric and said rupturable portion comprises a frangible warp fiber in said fabric.

20. The method of claim 14 wherein said woven cylindrical outer tubular belt member comprises fabric and said rupturable portion comprises a catch cord extending longitudinally in said fabric.

21. The method of claim 14 wherein said deceleration of the occupant, upon the vehicle encountering a crash event, extends over a period of time including a first phase during which rupture of said frangible portion of said outer belt member occurs, a second phase during which the inner inflatable belt member is inflated so that it expands out of the ruptured outer belt member, and a final phase in which said inflatable inner belt member is fully inflated, and the share of the occupant deceleration load on said outer belt member is progressively reduced during said second phase, from immediately following said first phase during which said rupture occurs, and into said final phase, and said inner inflatable belt member withstands progressively more of a share of said load during said second phase and into said final phase.

22. The method of claim 21 whereby the share of said load of said deceleration of the occupant imposed upon said outer belt member is substantially reduced at the end of said first phase, and in which' said inner inflatable belt member, when inflated, withstands an increased amount of said load in said final phase.

23. The method of claim 14 wherein there is a period of inflation of said inner inflatable belt member as it exits from within said outer belt member, and during said period of inflation, said inner inflatable belt member bears an increasing amount of the load of deceleration of the occupant upon the vehicle encountering a crash event, taking some of said load from said outer belt member.

* * * * *